United States Patent [19]

Pelletier et al.

[11] Patent Number: 5,174,536
[45] Date of Patent: Dec. 29, 1992

[54] AWNING HOOK FOR RECREATIONAL VEHICLE

[75] Inventors: Ralph W. Pelletier; Ila Pelletier, both of Zephyrhills, Fla.

[73] Assignee: The Dometic Corporation, Elkhart, Ind.

[21] Appl. No.: 754,620

[22] Filed: Sep. 4, 1991

Related U.S. Application Data

[62] Division of Ser. No. 349,070, May 8, 1989, abandoned.

[51] Int. Cl.⁵ ............................................. B42F 13/00
[52] U.S. Cl. .................................... 248/339; 248/300
[58] Field of Search ................. 248/224.2, 339, 223.4, 248/219.3, 307, 298; 211/94; 248/343, 225.2, 297.2, 280, 300; 160/66, 67

[56] References Cited

U.S. PATENT DOCUMENTS

| | | | |
|---|---|---|---|
| 3,502,222 | 3/1970 | Crafoord | 248/224.2 |
| 4,282,630 | 8/1981 | Toder | 248/307 X |
| 4,749,160 | 6/1988 | Shih | 248/223.4 X |
| 4,771,897 | 9/1988 | Ho | 211/94 X |
| 4,811,475 | 3/1989 | Morton, Jr. | 248/339 X |

Primary Examiner—Blair M. Johnson
Attorney, Agent, or Firm—Pearne, Gordon, McCoy & Granger

[57] ABSTRACT

A recreational vehicle includes an annular roller for supporting an awning fabric. The roller has a plurality of C-shaped retainer channels internally disposed at spaced positions on its annular periphery. A pair of these C-shaped channels are shaped to receive the awning fabric and to receive rods which extend through the awning fabric to hold the awning fabric in fixed position relative to the roller. A coupling member has a bead which is retained within another of the C-shaped retainer channels. The article also has a body portion which extends from the bead. A hole may be provided in the body portion to receive a member such as a hook. Different articles such as potted plants, clothes hangers and messages may be attached to the hook.

5 Claims, 1 Drawing Sheet

AWNING HOOK FOR RECREATIONAL VEHICLE

This is a divisional application of pending application Ser. No. 07/349,070, filed on May 8, 1989 abandoned.

BACKGROUND OF THE INVENTION

1. Field of the Invention

This invention relates to coupling members for use with a recreational vehicle to attach different articles to the recreational vehicle. More particularly, the invention relates to coupling members which can be conveniently connected to the awning roller bar of a recreational vehicle while parked for suspending articles from the awning roller bar.

2. Description of the Prior Art

When the occupants of a recreational vehicle reach a site where they can stay overnight or for a few days, such occupants wish to make their stay as pleasant as possible. For example, they may wish to hang potted plants around the outside periphery of the vehicle to provide the appearance of a hanging garden. Alternatively, they may wish to hang wet clothes from the recreational vehicle to give the clothes an opportunity to dry. As still another example, they may even wish to hang messages from the vehicle to communicate with friends at adjacent vehicle sites.

Many awnings used with recreational vehicles include a roller having an awning fabric attached thereto. The attachment of the awning fabric to the roller is typically made by providing the roller with internally disposed C-shaped retainer channels disposed at spaced positions around the annular periphery of the roller and extending along the axial length of the roller. An arrangement of this type is disclosed in U.S. Pat. No. 4,640,332 issued to Turner on Feb. 3, 1987.

Until now, it has been difficult to accomplish objectives such as those discussed in the previous paragraphs. This has been true even though recreational vehicles are now in widespread use and even though a considerable amount of effort has been devoted in providing a satisfactory solution to the problem. The present invention provides a simple and convenient solution to the problem discussed above. In this solution, an annular roller normally used to support an awning fabric is utilized to accomplish the objectives discussed above.

SUMMARY OF THE INVENTION

Many awning rollers have a plurality of C-shaped retainer channels internally disposed at spaced positions on its annular periphery. Typically, a pair of these C-shaped channels are shaped to receive the awning fabric and to receive rods which extend through the awning fabric to hold the awning fabric in fixed position relative to the roller. A preferred embodiment of the present invention has a bead which is retained within another C-shaped retainer channel in the roller. The bead may be slid to any desired position along the length of the C-shaped retainer channel. The coupling member also has a body portion which extends from the bead. A hole may be provided in the body portion to receive another support member, such as a hook. Different articles such as potted plants, clothes hangers and messages may be attached to the hook.

DECRIPTION OF THE PREFERRED EMBODIMENT

Figure 1:
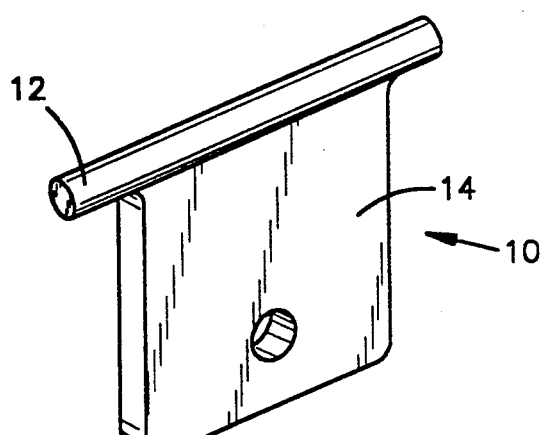
FIG. 1 is a front perspective view of a preferred embodiment of the present invention.
Figure 2:
FIG. 2 is a top view of the preferred embodiment of FIG. 1.
Figure 3:
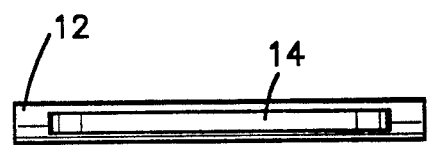
FIG. 3 is a bottom view of the preferred embodiment of FIG. 1.
Figure 4:
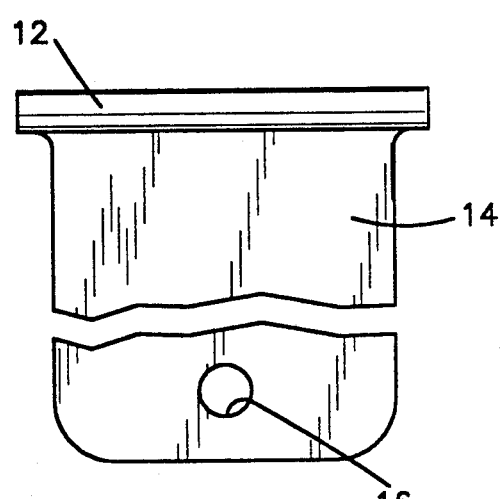
FIG. 4 is a front elevational view of the preferred embodiment of FIG. 1 with part of the preferred embodiment broken away.
Figure 5:
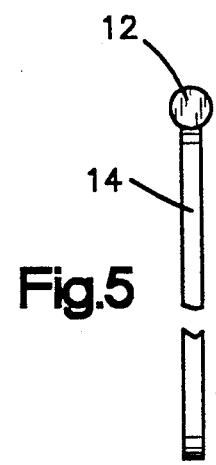
FIG. 5 is an end view of FIG. 4.
Figure 6:
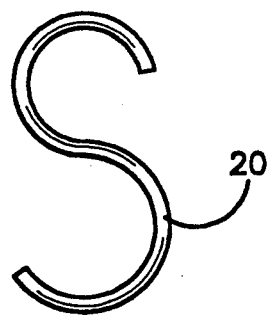
FIG. 6 is a front elevational view of an S-hook.
Figure 7:
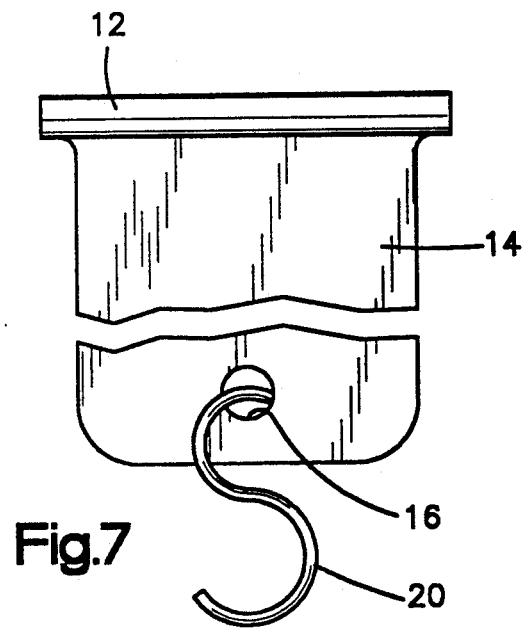
FIG. 7 is a front elevational view of the S-hook of FIG. 5 inserted within an aperture of the preferred embodiment of FIG. 1.

An awning roller is typically provided with at least one C-shaped retainer channel which is not used to retain the awning fabric. Referring to FIG. 1, a coupling member generally indicated at 10 is constructed to be retained by an awning retainer channel. The coupling member 10 includes a bead 12 shaped to be disposed in the retainer channel in slidable relationship thereto.

A body portion 14 extends downwardly from the bead 12. The bead 12 and the body portion 14 may be made from a suitable material such as a vinyl so as to have flexible properties. A hollow button 16 may be disposed around the hole in the body portion 14 to strengthen the body portion 14 in the area of the hole.

A support member, such as a hook 20, may be extended through the hole defined by the button 16. The hook 20 is preferably provided with an S-shaped configuration so that one leg of the S is retained by the body portion 14 and the other leg of the S may retain various types of articles. For example, the hook 20 may retain hanging flower pots to beautify the area around the recreational vehicle, or clothes hangers to provide for the drying of clothes in the open air and/or messages to occupants of neighboring sites.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

What is claimed is:

1. For use in a recreational vehicle having an awning assembly that includes an awning fabric attached to an enlongated cylindrical roll bar having a plurality of C-shaped peripheral retainer channels, a coupling member comprising: a substantially planar body portion having first and second end portions thereof and having at least two faces, said first end portion of said body portion having a bead, said body and said bead being of one-piece, integral construction, said second end portion of said body portion having a hole therein, said bead having a substantially circular cross-section and a longitudinal axis and having a length along its axis greater than the diameter of its cross-section being sized to be disposed in one of the C-shaped peripheral channels in sliding relationship thereto, wherein, when in use, said bead of said coupling member is slid into the C-shaped peripheral retainer channel so that said coupling member extends substantially vertically in a downward direction, and means for suspending an article from said coupling member.

2. A coupling member as recited in claim 1, further comprising:
   a button disposed in said hole in said second end portion of said body portion and having an annular opening,
   said hole being disposed near a bottom of said second end portion.

3. A coupling member as recited in claim 1, wherein said means for suspending an article from said coupling member comprises a hook extending through said hole in said second end portion of said body portion.

4. A coupling member as recited in claim 2, wherein said means for suspending an article from said coupling member comprises,
   an S-shaped hook extending through said opening of said button.

5. A coupling member as recited in claim 1, wherein the axis of the bead is between planes which are coplanar with faces of the body.

* * * * *